United States Patent
Saga

(10) Patent No.: US 7,198,191 B2
(45) Date of Patent: Apr. 3, 2007

(54) SIGNAL PROCESSING APPARATUS FOR RECORDING OR PLAYING BACK DATA

(75) Inventor: Yoshihiro Saga, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 428 days.

(21) Appl. No.: 10/927,018

(22) Filed: Aug. 27, 2004

(65) Prior Publication Data

US 2005/0047249 A1  Mar. 3, 2005

(30) Foreign Application Priority Data

Aug. 28, 2003  (JP) .............................. 2003-304622

(51) Int. Cl.
*G06K 5/00* (2006.01)
(52) U.S. Cl. ........................ 235/380; 235/487; 235/492
(58) Field of Classification Search ................ 235/380, 235/441, 435, 439, 492, 487
See application file for complete search history.

(56) References Cited

U.S. PATENT DOCUMENTS

| 5,450,551 A | 9/1995 | Amini et al. ................ 395/299 |
| 6,341,335 B1* | 1/2002 | Kanai et al. ................. 711/137 |
| 2006/0144928 A1* | 7/2006 | Takada et al. ............... 235/380 |
| 2006/0161696 A1* | 7/2006 | Anjo et al. .................... 710/22 |

FOREIGN PATENT DOCUMENTS

JP          6-337840          12/1994

OTHER PUBLICATIONS

"CF+ and CompactFlash Specification Revision 2.1" May 6, 2004, © 1998-2004 CompactFlash Association.
"Detailed Overview of the PC Card Standard" by PCMCIA/JEIDA, from website <http://www.pcmcia.org/pccardstandard.htm, visited Dec. 7, 2004.
"CF+ and CompactFlash Specification Revision 1.4" © 1998-99 CompactFlash Association (May 1999).
"PC Card Standard Release 8.0", by PCMCIA/JEITA (April 2001).
CDROMs containing documents (1) and (2), respectively.

* cited by examiner

Primary Examiner—Steven S. Paik
(74) Attorney, Agent, or Firm—Fitzpatrick, Cella, Harper & Scinto

(57) ABSTRACT

In writing image data having a first size in a memory card (4), a DMA circuit (12) transfers the image data to a memory card controller (6) until the write of the image data having the first size is ended. The memory card controller (6) checks that the state of the memory card is a predetermined state every time the write of image data having a second size smaller than the first size in the memory card (4) is ended and outputs a transfer end interrupt request signal to a CPU (2) in accordance with the end of the write of the image data having the first size in the memory card.

10 Claims, 7 Drawing Sheets

SIGNAL PROCESSING APPARATUS FOR RECORDING OR PLAYING BACK DATA

FIELD OF THE INVENTION

The present invention relates to a signal processing apparatus which records/plays back data in/from a recording medium.

BACKGROUND OF THE INVENTION

Digital cameras are one of examples of signal processing apparatuses which record/play back an image signal as a digital signal conventionally use a memory card as a recording medium of image data and the like. Representative examples of the memory card are a PC card and a CompactFlash (registered trademark). Data are written on or read out from these cards by using commands defined by ATA standard.

Of these memory cards, the control method of CompactFlash (registered trademark) is disclosed in *Cf+ and CompactFlash Specification Revision* 1.4 issued by CompactFlash Association. The control method of the PC card is disclosed in *PC Card Standard Release* 7 issued by PCMCIA/JEIDA.

For, e.g., a data write, the host issues a write sector command to the memory card. Processing waits until the card is set in the data writable state. That the card is set in the data writable state can be detected by using an interrupt request signal (IREQ signal) output from the card and the status register of the card. Upon detecting the assert of the IREQ signal, the host reads the status register of the card and confirms that the ready flag indicates the ready state, the data request flag indicates the data request state, and the error flag indicates no error state. When these states are confirmed, the host can write data of 1 sector on the card.

Even when the host should continuously write data of a plurality of sectors on the card, the card status must be confirmed for each sector.

Similarly, in reading out data from the memory card, the host issues a sector read command and confirms the IREQ signal and status register value. After that, the host can read out data of 1 sector.

Japanese Patent Laid-Open No. 6-337840 (corresponding to U.S. Pat. No. 5,450,551) discloses an example of a system which has an interface to such a memory card. In this system data transfer to the memory card is controlled by a DMA controller.

This means that DMA (Direct Memory Access) can be used for data transfer to/from a memory card.

On the other hand, a memory card such as CompactFlash (registered trademark) or PCMCIA I/O card using ATA standard requires check of the card status every time data having a predetermined size (e.g., 1 sector) is transferred.

When data transfer to/from a memory card is done by using DMA, the data transfer unit by DMA is set to 1 sector. The host must repeatedly execute status read, check, and DMA activation every time 1 sector is transferred.

The memory card can output an interrupt request signal (IREQ signal) for each data transfer unit. When this signal is connected to the interrupt request input of the CPU, it can execute status check for each sector.

When the IREQ signal is asserted, the CPU suspends the task that has been executed so far and saves the values of the register and stack related to the task in a memory. The CPU starts interrupt processing and executes the status read and check of the status value. The CPU confirms by comparison with expected values that the ready flag of the status register indicates the ready state, the data request flag indicates the data request state, and the error flag indicates no error state.

When the status values coincide with the expected values, the CPU activates the DMA controller and ends the interrupt processing. Accordingly, data of 1 sector can be DMA-transferred from the system memory to the memory card or from the memory card to the system memory.

Until the end of desired data transfer, the CPU repeatedly executes this processing, thereby achieving data transfer.

As described above, conventionally, the DMA is operated for each sector. In addition, the value of the status register of the card must be confirmed for each sector.

To do this, the CPU must execute interrupt processing for each sector.

Normally, the CPU executes not only processing for the memory card but also power supply control, serial communication, or image sensing control for a digital camera by processing various interrupt requests asserted by the device. The CPU also saves the stack and register.

Hence, the CPU does not always start reading the card status immediately after the card asserts the IREQ signal, and a time of several hundred ms may be consumed.

Accordingly, the time of several hundred ms is wasted after the memory card asserts the IREQ signal until the DMA controller starts data transfer to the memory card. As described above, the IREQ signal is asserted every time 1 sector is processed. As a result, the time required for transfer of all desired data between the host and the card increases.

This problem is serious especially in a digital camera.

A digital camera generates an image file upon photography and records it in a memory card. If the recording time in the memory card prolongs, the user must wait after a shot until the camera is ready for the next shot and may lose a shutter chance.

In addition, the CPU activates interrupt processing every time 1 sector is transferred. Since another ongoing progressing task is stopped every time, the execution speed of the task decreases.

As a result, in, e.g., a digital camera, the response of the user interface delays, or the moving image sensing capability degrades. Accordingly, automatic exposure or automatic white balance processing in a moving image cannot be achieved, resulting in a degradation in image quality.

In a digital camera, normally, an image sensing element reads a horizontal line in synchronism with a predetermined period and repeatedly reads horizontal lines in the vertical direction, thereby obtaining an image signal. At this time, the brightness or white balance of the image must appropriately be controlled. The digital camera analyzes the generated image data of one frame and sets the analysis result as parameters in the image sensing circuit. With this processing, the brightness or white balance of the image is appropriately controlled.

Thus, the image data analysis and parameter setting in the image sensing circuit must be completed within a time between frames, which is generally called the vertical blanking period.

If data is transferred to a memory card, the system bus is occupied during the data transfer, and control of the image brightness or white balance cannot be ended till the next frame in some cases. This also leads to a degradation in image quality.

SUMMARY OF THE INVENTION

The present invention has been made to solve the above-described problems, and has as its object to shorten the data transfer time between a host and a memory card and improve the processing capability during data transfer to a memory card by an information device, thereby improving the response and image sensing capability.

According to an aspect of the present invention, it is provided that a signal processing apparatus comprising: a microprocessor; memory control means for writing data in a memory device; and memory access means for transferring the data to the memory control means in accordance with an instruction from the microprocessor, wherein in writing the data having a first size in the memory device, the memory access means transfers the data to the memory control means until the write of the data having the first size is ended, and the memory control means checks that a state of the memory device is a predetermined state every time the write of the data having a second size smaller than the first size in the memory device is ended, and outputs an interrupt request signal to the microprocessor in accordance with an end of the write of the data having the first size in the memory device.

According to another aspect of the present invention, it is provided that a signal processing apparatus comprising: a microprocessor; memory control means for reading out data from a memory device; and memory access means for transferring the data read out by the memory control means in accordance with an instruction from the microprocessor, wherein in reading out the data having a first size from the memory device, the memory access means transfers the data read out from the memory control means until the read of the data having the first size is ended, and the memory control means checks that a state of the memory device is a predetermined state every time the read of the data having a second size smaller than the first size from the memory device is ended, and outputs an interrupt request signal to the microprocessor in accordance with an end of the read of the data having the first size from the memory device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
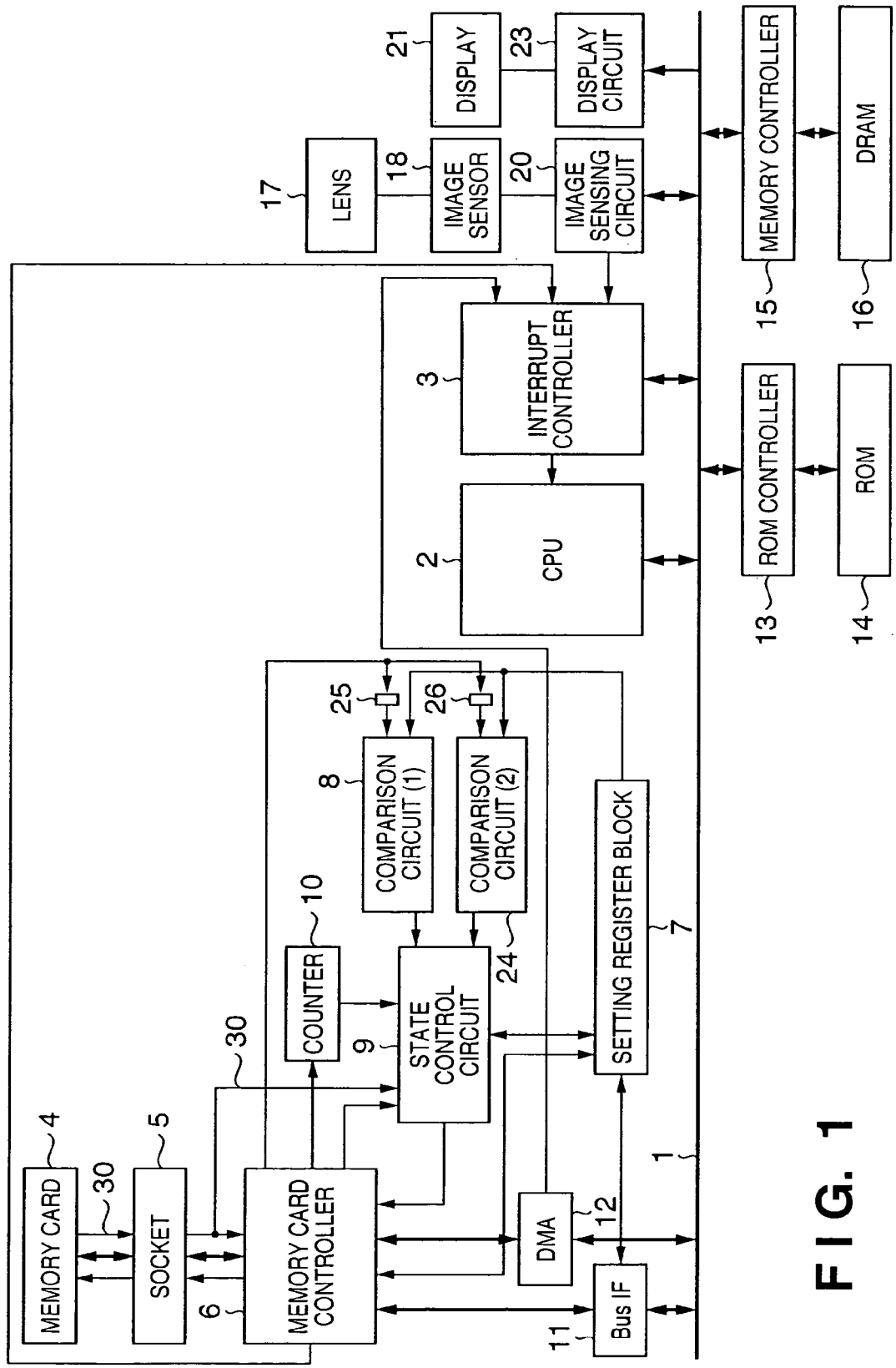
FIG. 1 is a block diagram showing the arrangement of an apparatus according to the embodiment.

FIG. 1 is a block diagram showing the arrangement of a digital camera as an embodiment of a signal processing apparatus apparatus of the present invention.

A system bus 1 includes an address bus, data bus, and control signal. A CPU 2 controls the sequence of the camera. A program to operate the camera is written in a ROM 14. The CPU 2 can read the ROM 14 through the system bus 1 and a ROM controller 13 and accordingly execute instructions recorded in the ROM 14.

Reference numeral 15 denotes a memory controller; and 16, a DRAM. The memory controller 15 receives a DRAM access request from the system bus 1, generates an access signal to the DRAM 16, and executes a data write in the DRAM 16 or a data read from the DRAM 16. The DRAM 16 holds work data when the CPU 2 executes the program. The DRAM 16 also holds image data generated by the photographing operation of the camera or image data to be played back on a display 21. The CPU 2 can also execute instructions recorded in the DRAM 16.

Reference numeral 17 denotes a lens to form an object image; and 18, an image sensor. An image sensing circuit 20 processes a digital image signal obtained from the image sensor 18 to generate digital image data. The image sensing circuit 20 outputs, to an interrupt controller 3, a signal synchronized with image sensing processing executed at a predetermined period.

A display circuit 23 generates an image signal from the digital image data on the DRAM 16 and outputs the image signal to the display 21. The display 21 includes a color liquid crystal display panel or the like and displays an image.

A memory card 4 mainly stores image files obtained by photography. The memory card is a card capable of recording/playback such as a PCMCIA I/O card or CompactFlash (registered trademark). The data write and data read are controlled by, e.g., an ATA command. Data transfer is done in a predetermined data amount such as 1 sector or 512 bytes.

A socket (connector) 5 of the memory card allows attachment/detachment of the memory card 4. The data bus of, e.g., CompactFlash (registered trademark) includes a 16-bit data line, address line, and control signal line.

A memory card controller 6 controls the data line, address line, and control signal line of the memory card 4. The memory card controller 6 can perform command issue for the memory card 4, write/read access to the registers of the memory card, and data write/read in/from the memory card 4. The memory card controller 6 is connected to the system bus 1 through a bus interface 11 so that the CPU 2 can control the memory card controller 6 and write/read access to the memory card.

A DMA (Direct Memory Access) circuit 12 as memory access means is also connected to the memory card controller 6. The DMA circuit 12 transfers a predetermined amount of data from a predetermined address by using a transfer start address and transfer data length which are set by the CPU 2 in advance. The DMA circuit 12 can generate, as a bus mater, a control signal and address to the system bus 1 and also issue a write access request and read access request to the memory card controller 6.

Accordingly, data transfer between the memory card controller 6 and a device such as the DRAM 16 mapped to a predetermined address can be executed in synchronism with data access of the memory card controller 6 without causing the CPU 2 to execute data transfer access.

A counter 10 is connected to the memory card controller 6. When data read or data write processing for the memory card 4 is generated, the memory card controller 6 outputs a count-up signal to the counter 10. The counter 10 counts the number of data reads or data writes executed by the memory card controller 6. When the number of times of access has reached a value corresponding to 1 sector, the counter 10 outputs a signal to a state control circuit 9.

Some kinds of memory cards allow transfer of data in number corresponding to a plurality of sectors by only one status check.

In this case, the counter 10 may be set such that is can generate a signal upon counting the maximum number of data transferable by one status check.

Comparison circuits 8 and 24 are connected to the memory card controller 6. The memory card controller 6 reads out the value of the status register of the memory card 4 and outputs the value to the comparison circuits 8 and 24.

A setting register block 7 stores set values related to the control operation of the memory card 4. The setting register block 7 can be read- or write-accessed from the CPU 2 through the system bus 1 and bus interface 11.

The setting register block 7 stores the expected value (first expected value) of the card status in one register in it. The first expected value is output to the comparison circuit 8. The setting register block 7 stores the expected value (second expected value) of the card status in another register. The second expected value is output to the comparison circuit 24.

A mask circuit 25 is inserted between the comparison circuit 8 and the memory card controller 6. A mask circuit 26 is inserted between the comparison circuit 24 and the memory card controller 6. The mask circuits 25 and 26 are logic circuits which pass specific bits in input data. The bits which should pass through the mask circuit 25 can be selected. The set value is held by the setting register block 7. Similarly, the bits which should pass through the mask circuit 26 can be selected. The set value is held by the setting register block 7. Accordingly, the CPU 2 can independently set the bits which should pass through the mask circuits 25 and 26.

The comparison circuit 8 compares the value of the status register of the memory card 4, which is read out from the memory card 4, with the first expected value, and outputs the comparison result to the state control circuit 9. Similarly, the comparison circuit 24 compares the value of the status register of the memory card 4, which is read out from the memory card, with the second expected value, and outputs the comparison result to the state control circuit 9.

The state control circuit 9 is a state machine which controls the sequence of memory access. The operation will be described later in detail.

Figure 2:
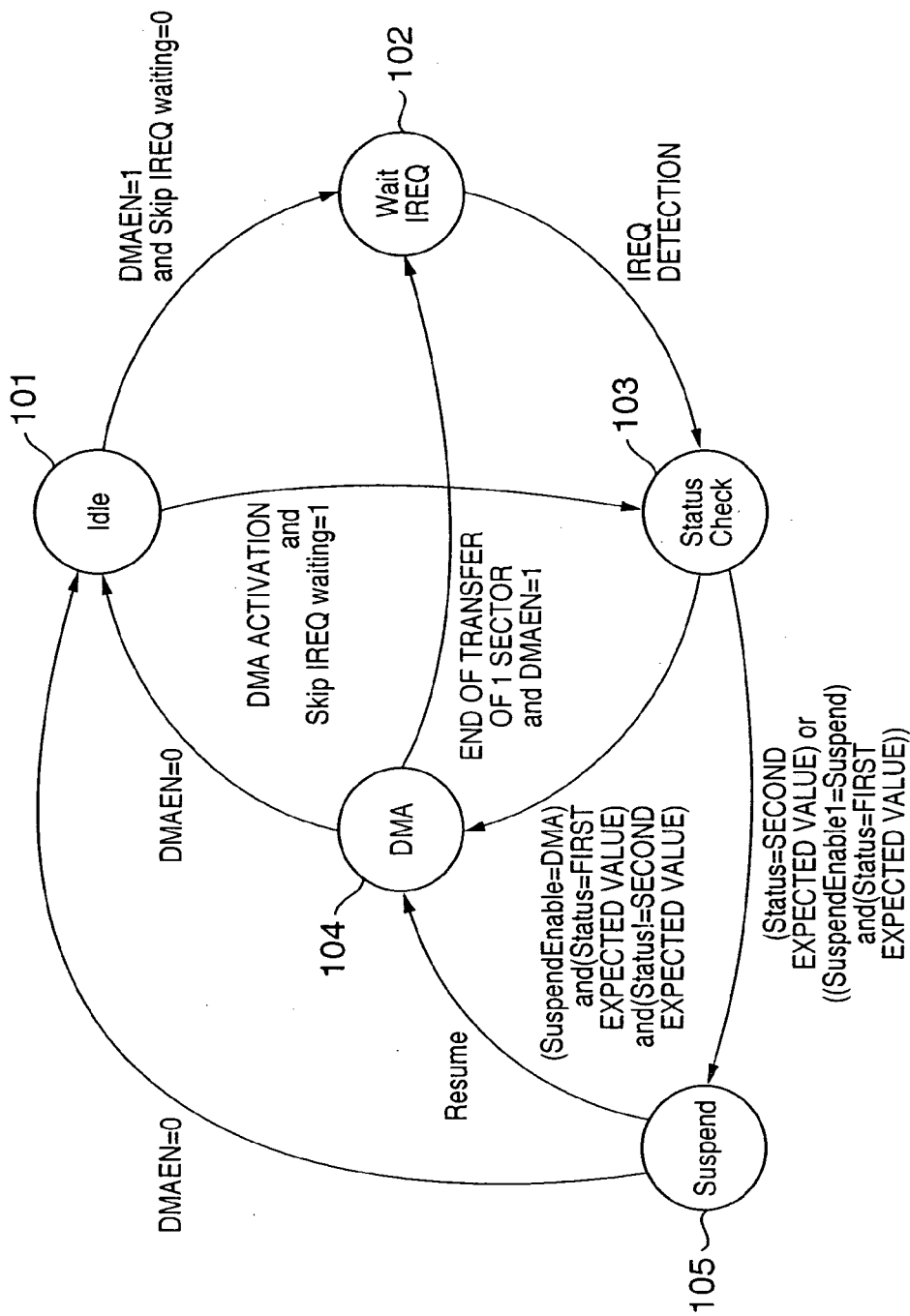
FIG. 2 is a view showing the state transition of a state control circuit.
Figure 3:
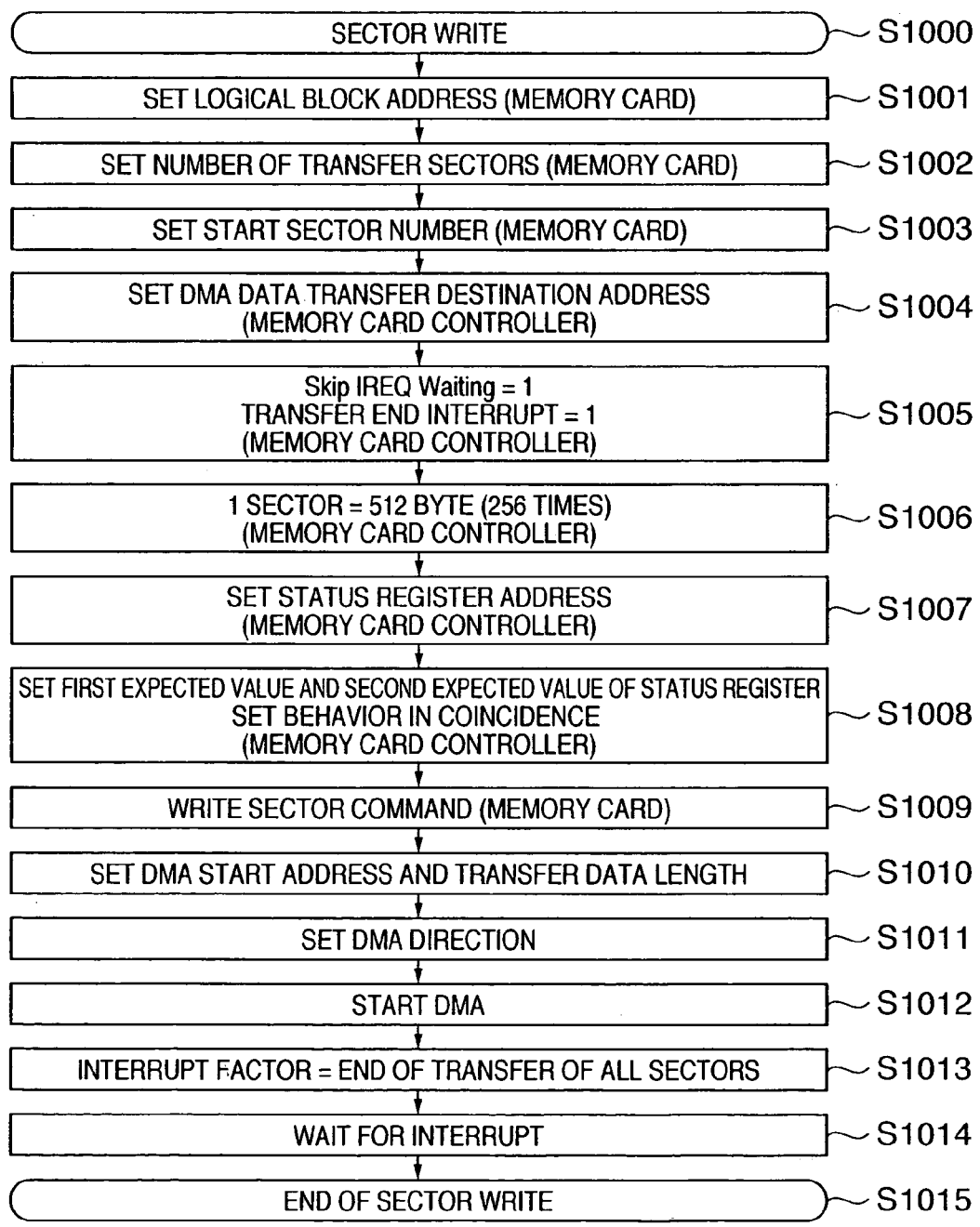
FIG. 3 is a flowchart showing the flow of processing in a data write.

The operation in the data write in the memory card 4 will be described next with reference to FIGS. 1, 2, 3 and 4. FIG. 2 is a view showing the operation of the state control circuit 9. FIG. 3 is a flowchart showing the operation of the CPU 2.

In step S1000 in FIG. 3, the CPU 2 starts data write processing.

First, in step S1001, the CPU 2 sets a logical block address for data transfer to the memory card 4. In step S1002, the CPU 2 sets the number of transfer sectors. In step S1003, the CPU 2 sets the start sector number at which transferred data is to be recorded. These operations are executed when set value write instructions by the CPU 2 are transmitted to the memory card controller 6 through the system bus 1 and bus interface 11, and the memory card controller 6 controls the memory card 4.

In step S1004, the CPU 2 designates a DMA transfer destination address to the memory card controller 6. The DMA transfer destination address indicates an address mapped on the memory card 4. In this case, an address indicating the data register is designated. The address value is stored in the setting register block 7.

In step S1005, the CPU 2 sets "1" in the Skip IREQ Waiting register and "1" in the transfer end interrupt enable register. The Skip IREQ Waiting register is a register which exists in the setting register block 7. The operation of the state control circuit 9 is determined depending on whether the value of this register is "0" or "1". The transfer end interrupt enable register holds a value to determine the operation of the function of asserting an interrupt request when the memory card controller 6 has completely transferred all data to the memory card 4. When this value is "1", and the memory card controller 6 determines that all data are completely transferred on the basis of that a DMAEN signal is negated, transfer for each sector is ended, and the memory card asserts the IREQ signal, a transfer end interrupt request signal is asserted.

In step S1006, the CPU 2 sets, in the memory card controller 6, the number of data of 1 sector, i.e., the number of data writes necessary for transfer of 1 sector.

When the memory card is used under a general file system, 1 sector contains 512 bytes. When the memory card has a 16-bit data bus, the number of data writes is 256. This value is stored in the setting register block 7.

In steps S1007 and S1008, the CPU 2 sets the address and expected value of the status register of the memory card 4. The status register of the memory card 4 indicates the state of the memory card 4. It can be determined by reading the status register whether the memory card is in a ready state, data request state, or error state.

In a data write or data read, the register must have a predetermined value, i.e., a value representing that, e.g., the memory card is in the read state and data request state and not in the error state. This value is set as the first expected value in the setting register block. The value of the status register read out from the memory card 4 is compared with the expected value to check the status value. To detect an error, an error bit is set as the second expected value of the setting register block. In addition, the mask circuit 26 is set to mask bits other than the error bit.

The CPU 2 can also set the behavior of the state machine when the comparison circuits indicate coincidence. To set this, a SuspendEnable register is present. The set value of the SuspendEnable register can be selected from "continue DMA" and "suspend DMA". When the comparison circuit 8 indicates coincidence, "continue DMA" is selected. When the comparison circuit 24 indicates coincidence, "suspend DMA" is selected. The selected value is set in the SuspendEnable register.

In step S1009, the CPU 2 issues a write sector command to the memory card 4. Accordingly, the memory card 4 is set in a writable state. This will be described later.

In step S1010, the CPU 2 sets, in the DMA circuit 12, the start address at which data to be DMA-transferred is present. The data to be transferred to the memory card 4 is present in the DRAM 16. Hence, the DMA transfer address set in the DMA circuit 12 is the start address of the transfer target data on the DRAM 16. The CPU 2 also sets the size of the data to be DMA-transferred in the DMA circuit 12.

In step S1011, the CPU 2 sets, in the DMA circuit 12, the direction from the DRAM 16 to the memory card 4 as the DMA data transfer direction.

Figure 4:
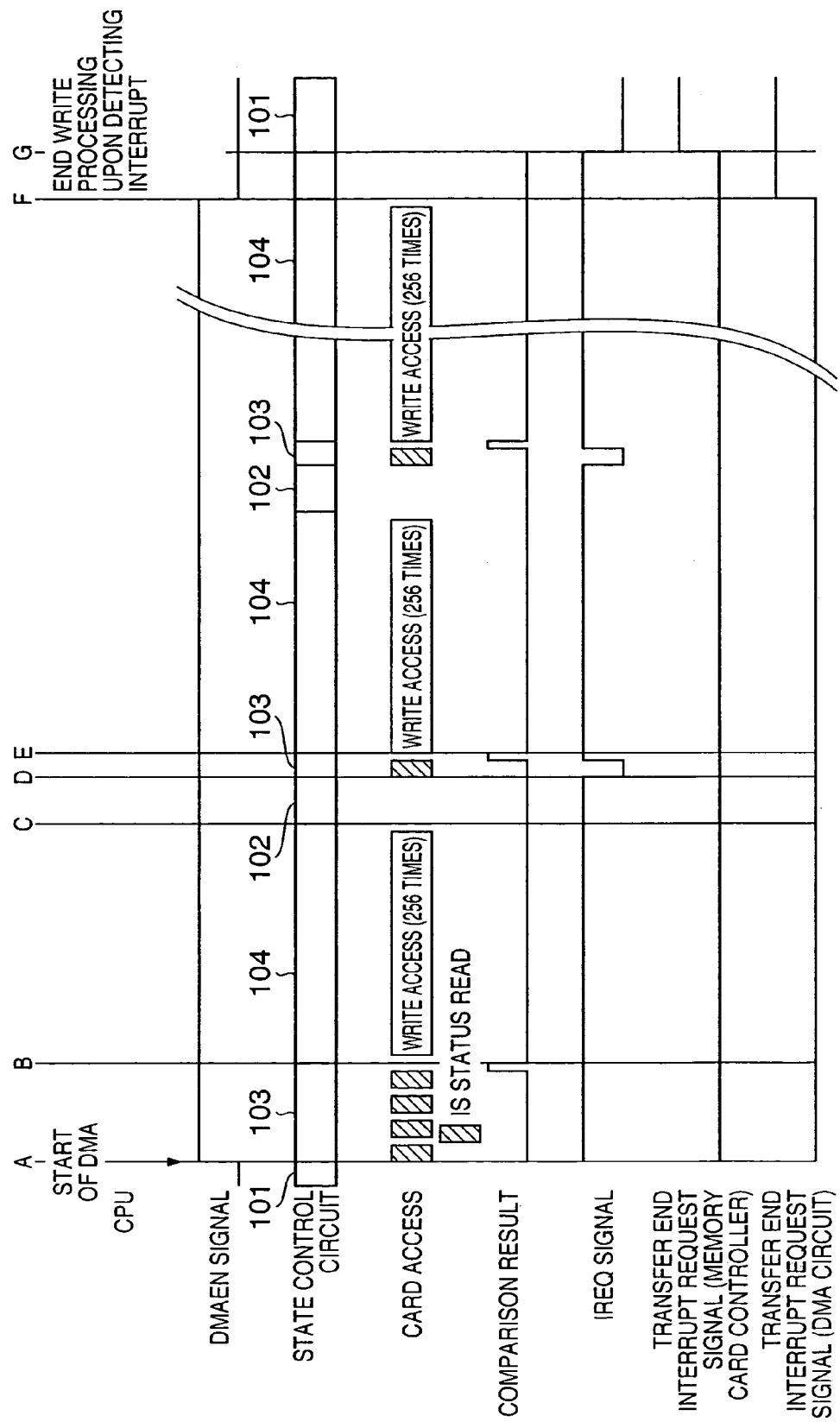
FIG. 4 is a timing chart showing the operation in the data write.

In step S1012 in FIG. 3 and at A in FIG. 4, the CPU 2 instructs the DMA circuit 12 to start DMA transfer. Accordingly, the DMA circuit 12 asserts the DMAEN signal to 1.

In step S1013, the CPU 2 sets, in the interrupt controller 3, a transfer end interrupt generated by the memory card controller 6 as an interrupt request to the CPU 2. Accordingly, until the memory card controller 6 indicates the end of data transfer, the CPU 2 need not execute processing related to data transfer between the memory card 4 and the DRAM 16.

When the tasks of the system are controlled by a multitask OS, the CPU 2 can process other tasks until an interrupt is generated.

The reason why not the DMA circuit 12 but the memory card controller 6 is selected as the interrupt factor is as follows. The memory card controller 6 controls the memory card 4. Hence, when the memory card controller 6 is selected, it can be detected that all data are transferred to the memory card 4.

Referring to FIG. 2, the state control circuit 9 sets an idle state 101 after activation of the digital camera until this step, i.e., in the initial state. When the CPU 2 instructs the DMA circuit 12 to start DMA transfer in step S1012, the DMA circuit 12 asserts the DMAEN signal. The DMAEN signal is transmitted to the state control circuit 9 through the memory card controller 6. Since the DMAEN signal is asserted, and the value of the Skip IREQ Waiting register has been set to "1" in advance, the state control circuit 9 causes transition to a status check state 103.

In this embodiment, for the first sector in a data write or data read, it can be selected by the Skip IREQ Waiting register whether the function of waiting for assertion of the IREQ signal is to be operated. This is because memory cards such as CompactFlash (registered trademark) and PCMCIA I/O card using ATA standard change the IREQ signal behavior between the data read and the data write.

In a data read, these memory cards assert the IREQ signal even for the first sector after the issue of a read command. However, in a data write, the memory cards do not assert the IREQ signal for the first sector after the issue of a write command.

When the state control circuit 9 sets the status check state 103, the memory card controller 6 repeatedly reads the status register of the memory card 4. The read value is compared with the expected value set in the comparison circuit 8 in advance. If the comparison result indicates incoincidence, the state control circuit sets the state 103. The memory card controller 6 repeatedly reads the status register until the comparison result indicates coincidence.

As described above, from A to B in FIG. 4, the status register of the memory card 4 is repeatedly read. When the memory card 4 changes the status value to a desired value, and the comparison result from the comparison circuit 8 indicates coincidence with the first expected value at B, the state control circuit 9 causes transition to a DMA state 104 in FIG. 2 at B in FIG. 4.

When the state control circuit 9 sets the state 104, the memory card controller 6 receives data from the DMA circuit 12 in synchronism with the DMA request signal asserted by the DMA circuit 12 and writes the data in the data register of the memory card 4. The memory card controller 6 writes the data in the data register because the data transfer destination is set to the address indicating the data register in advance in step S1004.

While the state control circuit 9 sets the state 104, the memory card controller 6 repeatedly executes data writes. Simultaneously, the counter 10 counts the number of data writes.

When the number of data writes has reached the value corresponding to 1 sector, the counter 10 asserts a signal representing it to the state control circuit 9.

Assume that at C in FIG. 4, the counter 10 indicates that a data write of 1 sector is ended, and the last transfer is ended. The state control circuit 9 evaluates the value of the DMAEN signal. The DMAEN signal is asserted to "1" when transfer starts and negated to "0" when the preset data size has wholly been transferred.

Hence, if the DMAEN signal is in the asserted state after the transfer of 1 sector is ended, it indicates that data to be transferred still remains.

Accordingly, the state control circuit 9 causes transition to the state 102 in FIG. 2 at C in FIG. 4. When the Wait IREQ state 102 is set by the state control circuit 9, the memory card controller 6 waits until the memory card 4 asserts the IREQ signal.

The memory card 4 asserts the IREQ signal when it is set in a data transferable state. The IREQ signal indicates the asserted state, i.e., interrupt request state at "0" and negated state at "1". Assume that at D in FIG. 4, the memory card 4 asserts the IREQ signal. Accordingly, the state control circuit 9 causes transition to the state 103. The memory card controller 6 reads the status register of the memory card 4. The comparison circuit 8 compares the status of the memory card 4 with the expected value again. Transition to the state 104 occurs again at E in FIG. 4 so that a data write for 1 sector is done in synchronism with DMA.

Assume that the above processing is executed repeatedly, and all target data are transferred from the DRAM 16 to the memory card controller 6 at F in FIG. 4. The DMAEN signal is negated to "0" simultaneously as the transfer of 1 sector is ended. Hence, the state control circuit 9 causes transition to the idle state 101.

Upon determining at G in FIG. 4 that the DMAEN signal is negated, the transfer for each sector is ended, and the memory card 4 asserts the IREQ signal, the memory card controller 6 outputs a transfer end interrupt request signal to the interrupt controller 3. The interrupt controller 3 asserts the request signal to the CPU 2.

Accordingly, the CPU 2 can know that the data write in the memory card 4 is reliably ended. Hence, any accident that the next command to the memory card is erroneously issued before the end of data transfer can be prevented. In a digital camera, normally, a warning is displayed during the data write operation in the memory card to prevent the user from removing the memory card. In this embodiment, the interrupt request is output to the CPU when the data write is completely ended. Hence, such warning display can reliably be ended.

By the data write end interrupt, the CPU 2 stops executing another task and returns execution processing to step S1014 in the sector write processing in FIG. 3. The CPU 2 ends the data write processing for the memory card in step S1015.

The data write in the memory card 4 is thus ended.

From step S1013 immediately after the start of data transfer to the memory card 4 until step S1014 in which the data transfer is ended, the CPU 2 need not execute any processing related to the memory card 4. For this reason, the CPU 2 can execute another task during this time.

In the data transfer to the memory card 4, the CPU 2 need neither confirm the status nor activate interrupt processing by the IREQ signal. Hence, the coincidence between the status and the expected value is instantaneously determined so that the DMA circuit 12 can start data transfer immediately after the status of the memory card 4 changes to "ready".

A case in which the status value of the memory card 4 indicates an error state will be described here.

The value of the error bit is set as the second expected value in advance. The mask circuit 26 is set to mask bits other than the error bit.

In the state 103 in FIG. 2, the status register of the memory card 4 is read. If the error bit of the status value is true, the comparison circuit 24 transmits the result to the state control circuit 9. The state control circuit 9 causes transition to a state 105 in FIG. 2. Although DMA has been activated, and data transfer is requested, the memory card controller 6 does not access the memory card 4. That is, the DMA processing is suspended.

If the error can be avoided, the CPU 2 may output a resume instruction to the memory card controller 6 to resume data transfer. If the error is unavoidable, the DMA processing is stopped. As a result, the DMAEN signal changes to "0", and the state control circuit 9 causes transition to the initial state 101. Hence, data transfer is stopped, and for example, the memory card 4 can be initialized.

If data to be written in the memory card 4 is present on the DRAM 16, the logic address is changed, and the data write is retried.

The operation in the data read from the memory card 4 will be described next with reference to FIGS. 1, 2, 5 and 6.

Figure 5:
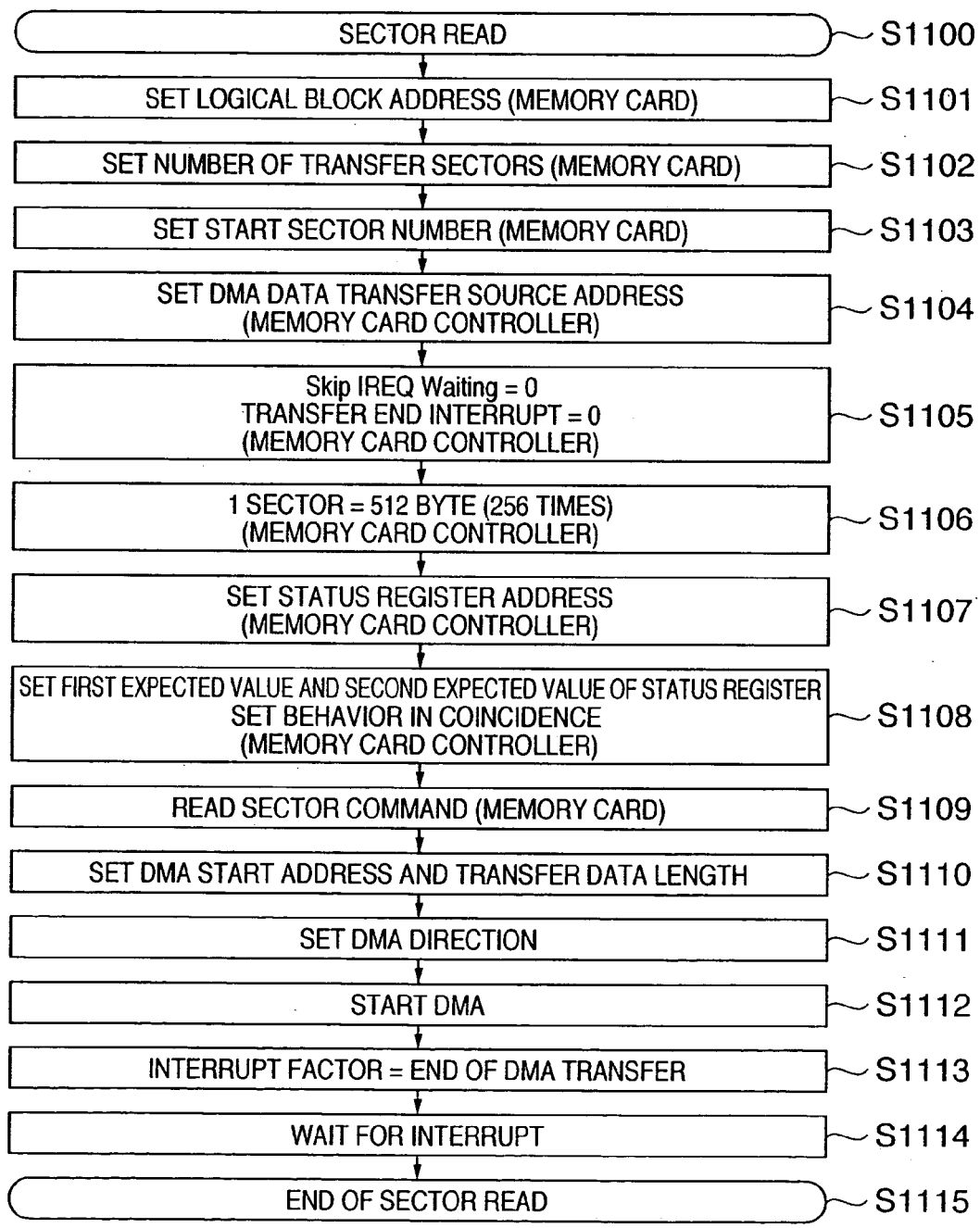
FIG. 5 is a flowchart showing the flow of processing in a data read.

In step S1100 in FIG. 5, the CPU 2 starts data read processing.

First, in step S1101, the CPU 2 sets a logical block address for data transfer to the memory card 4. In step S1102, the CPU 2 sets the number of transfer sectors. In step S1103, the CPU 2 sets the start sector number at which transferred data is to be recorded.

In step S1104, the CPU 2 designates an address indicating the data register of the memory card 4 to the memory card controller 6 as a DMA transfer source address.

In step S1105, the CPU 2 sets "0" in the Skip IREQ Waiting register. This is because the memory card 4 should assert the IREQ signal even for the first sector in reading the sector. At this time, the CPU 2 sets "0" in the transfer end interrupt enable register.

In step S1106, the CPU 2 sets 512 bytes in the memory card controller 6 as the number of data of 1 sector. In steps S1107 and S1108, the CPU 2 sets the address and expected value of the status register of the memory card 4. In step S1109, the CPU 2 issues a read sector command to the memory card 4.

In step S1110, the CPU 2 sets, in the DMA circuit 12, the start address of a data storage area on the DRAM 16 as an address at which data is to be recorded. The CPU 2 also sets the size of the data to be DMA-transferred in the DMA circuit 12.

In step S1111, the CPU 2 sets, in the DMA circuit 12, the direction from the memory card 4 to the DRAM 16 as the DMA data transfer direction.

Figure 6:
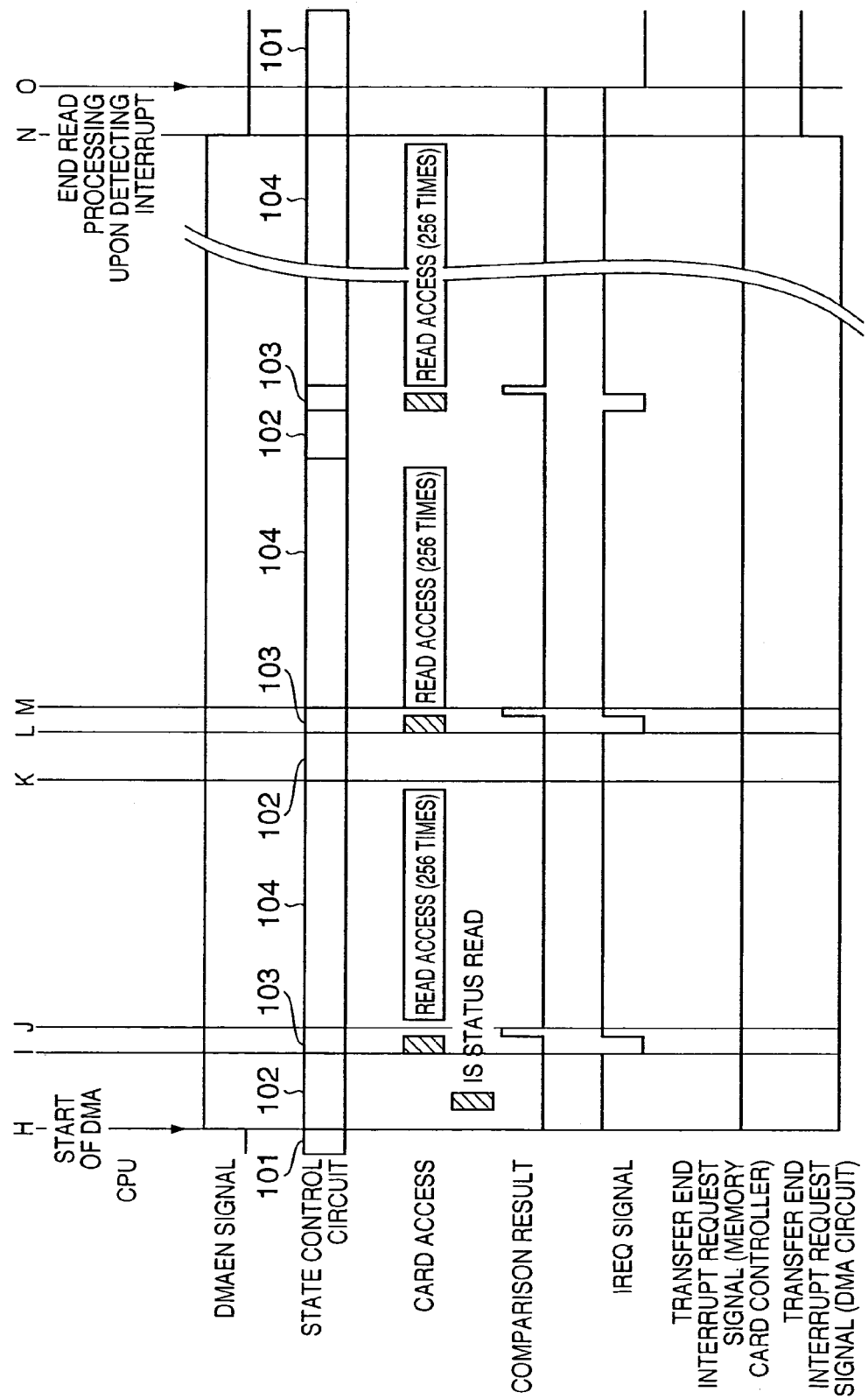
FIG. 6 is a timing chart showing the operation in the data read.

In step S1112 in FIG. 5 and at H in FIG. 6, the CPU 2 instructs the DMA circuit 12 to start DMA transfer. Accordingly, the DMA circuit 12 asserts the DMAEN signal to 1.

In step S1113, the CPU 2 sets, in the interrupt controller 3, a transfer end interrupt generated by the DMA circuit 12 as an interrupt request to the CPU 2. Accordingly, until the DMA circuit 12 indicates the end of data transfer, the CPU 2 need not execute processing related to data transfer between the memory card 4 and the DRAM 16.

When the tasks of the system are controlled by a multitask OS, the CPU 2 can process other tasks until an interrupt is generated.

The reason why the DMA circuit 12 is selected as the interrupt factor is as follows. The DMA circuit 12 which generates a transaction to the memory can detect that all data are transferred to the DRAM 16.

Referring to FIG. 2, the state control circuit 9 sets the idle state 101 after activation of the digital camera until this step. When the CPU 2 instructs the DMA circuit 12 to start DMA transfer in step S1112, the DMA circuit 12 asserts the DMAEN signal. The DMAEN signal is transmitted to the state control circuit 9 through the memory card controller 6.

Since the DMAEN signal is asserted, and the value of the Skip IREQ Waiting register has been set to "1" in advance, the state control circuit 9 causes transition to the Wait IREQ state 102. Accordingly, the memory card controller waits until the card asserts the IREQ signal. When the IREQ signal is asserted, transition to the status check state 103 occurs at I in FIG. 6.

When the state control circuit 9 sets the state 103, the status register of the memory card 4 is repeatedly read. When the memory card 4 changes the status value to a desired value, the comparison result from the comparison circuit 8 indicates coincidence with the expected value at J. The state control circuit 9 causes transition to the DMA state 104 in FIG. 2 at J in FIG. 6.

When the state control circuit 9 sets the state 104, the memory card controller 6 receives data from the data register of the memory card 4 in synchronism with the DMA request signal asserted by the DMA circuit 12 and transfers the data to the DRAM 16. While the state control circuit 9 sets the state 104, the memory card controller 6 repeatedly executes the data read. Simultaneously, the counter 10 counts the number of data reads.

When the count value coincides with the number of data reads for 1 sector, the counter 10 asserts a signal representing it to the state control circuit 9.

Assume that at K in FIG. 6, the counter 10 indicates that the data read of 1 sector is ended, and the last transfer is ended. The state control circuit 9 evaluates the value of the DMAEN signal. If the DMAEN signal is in the asserted state after the transfer of 1 sector is ended, it indicates that data to be transferred still remains.

Accordingly, the state control circuit 9 causes transition to the state 102 in FIG. 2 at K in FIG. 6. When the Wait IREQ state 102 is set by the state control circuit 9, the memory card controller 6 waits until the memory card 4 asserts the IREQ signal.

The memory card 4 asserts the IREQ signal when it is set in a data transferable state. When the memory card 4 asserts the IREQ signal at L in FIG. 6, the state control circuit 9 causes transition to the state 103. The memory card controller 6 reads the status register of the memory card 4. The comparison circuit 8 compares the status of the memory card 4 with the expected value again. Transition to the state 104 occurs again at M in FIG. 6 so that the data read for 1 sector is done in synchronism with DMA.

Assume that the above operation is executed repeatedly, and all target data are transferred from the memory card controller 6 to the DRAM 16 at N in FIG. 6. The DMAEN signal is negated to "0" simultaneously as the transfer of 1 sector is ended. Hence, the state control circuit 9 causes transition to the idle state 101.

The memory card controller 6 does not assert the transfer end interrupt request signal at O in FIG. 6. On the other hand, the DMA circuit 12 asserts the transfer end interrupt request signal at N when all data are transferred to the DRAM 16. The CPU 2 detects the end of transfer of all data when the DMA circuit 12 asserts the transfer end interrupt request signal.

The CPU 2 detects the interrupt in step S1114 in FIG. 5 and ends the data read processing from the memory card 4 in step S1115.

The data read from the memory card 4 is thus ended.

From step S1113 immediately after the start of data read from the memory card 4 until step S1114 in which the data transfer is ended, the CPU 2 can end the data write of a plurality of sectors without executing any processing related to the memory card 4. For this reason, the CPU 2 can execute another task during this time.

In the data transfer from the memory card 4, the CPU 2 need neither confirm the status nor activate interrupt processing by the IREQ signal. Hence, the coincidence between the status and the expected value is instantaneously determined so that the DMA circuit can start data transfer immediately after that.

As described above, in this embodiment, no interrupt processing is executed by the CPU between detection of the IREQ signal, check of the status register value, and activation of DMA. For this reason, these processing operations can instantaneously be ended, and data transfer between the memory card and the apparatus can be ended in a short time. Accordingly, a convenient digital camera with a short photographing interval can be realized.

During data transfer to/from the memory card, the CPU can execute another task. This task is not interrupted for each sector of data transfer. Hence, the processability of the CPU increases. Accordingly, a convenient digital camera which operates responsively to, e.g., a user operation can be realized.

In this embodiment, data transfer between the memory card and the DRAM may be suspended during a predetermined period and resumed when the period is ended.

For this purpose, a SuspendEnable register is present, which sets the behavior of the state machine when the comparison circuits indicate coincidence. The behavior can be selected from "continue DMA" and "suspend DMA".

Figure 7:
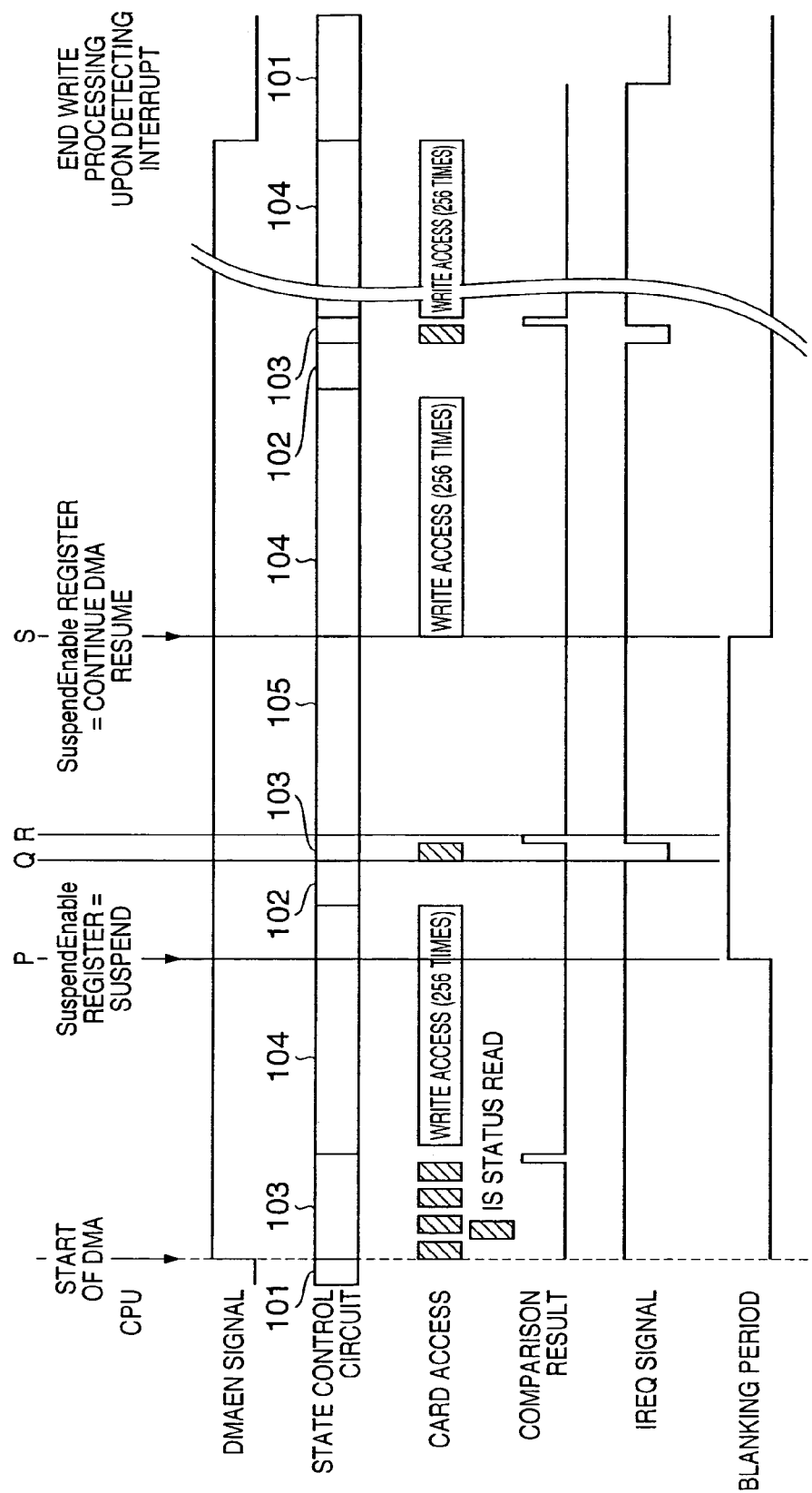
FIG. 7 is a timing chart showing a data transfer interrupt operation.

FIG. 7 is a timing chart showing an operation during execution of data transfer.

At P during execution of data transfer, the CPU 2 changes the value of the SuspendEnable register related to the comparison result from the comparison circuit 8 from "continue DMA" to "suspend DMA". At Q, the state control circuit 9 causes transition to the state 103 so the status register is read. The comparison circuit 8 indicates coincidence between the data.

At R, the state control circuit 9 causes transition to the suspend state 105 in accordance with the setting. Accordingly, DMA transfer between the memory card 4 and the DRAM 16 is suspended.

At S, the CPU 2 returns the value of the SuspendEnable register to "continue DMA" and instructs the memory card controller 6 to resume data transfer. Accordingly, the state control circuit 9 resumes data transfer.

In a digital camera, it is sometimes preferable to give priority to program execution by the CPU in synchronism with the image sensing operation.

For example, exposure or white balance of a sensed image must be adjusted in image sensing. Image sensing processing is done in synchronism with a horizontal sync signal or vertical sync signal. The time between frames is called a V (vertical) blanking period. In exposure or white balance processing, arithmetic processing is executed by using the image data of one frame obtained from the image sensing element. The control value for exposure or white balance control must be set in the image sensing circuit before image sensing of the next frame starts. To do this, processing from the arithmetic processing to the parameter set must be ended during the V blanking period.

During the V blanking period, the system bus, ROM, and DRAM are preferably preferentially used for exposure or white balance control. It is undesirable to use these components for data transfer to the memory card.

For this purpose, the SuspendEnable register is changed to "suspend DMA" before the start of the V blanking period. When the V blanking period is ended, the value of the SuspendEnable register is returned to "continue DMA", and a resume instruction is output to the memory card controller 6.

The image sensing circuit 20 outputs, to the interrupt controller 3, an interrupt request just at a time corresponding to 1 sector of memory card access before the start of the V blanking period. The interrupt request is output even at the end of V blanking period. Upon detecting, by the interrupt, that the V blanking period will start soon, the CPU 2 changes the SuspendEnable register to "suspend DMA". Upon detecting, by the interrupt, that the V blanking period is ended, the CPU 2 returns the SuspendEnable register to "continue DMA" and instructs the memory card controller 6 to resume.

With this processing, data transfer to the memory card 4 is not executed during the V blanking period. During the V blanking period, the CPU can execute processing related to image sensing at maximum. In addition, except the V blanking period, data transfer to the memory card 4 can be executed in a short time.

As described above, in this embodiment, at the time of image sensing, processing necessary for image sensing can be executed with priority over data transfer to the memory card. Hence, a high-quality digital camera which can reliably execute image sensing processing can be implemented.

As described above, according to the present invention, data transfer to/from a memory device can be ended in a short time.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-304622 filed on Aug. 28, 2003, which is hereby incorporated by reference herein.

What is claimed is:

1. A signal processing apparatus comprising:
a microprocessor;
memory control means for writing data in a memory device; and
memory access means for transferring the data to said memory control means in accordance with an instruction from said microprocessor,
wherein in writing the data having a first size in the memory device, said memory access means transfers the data to said memory control means until the write of the data having the first size is ended, wherein said memory control means checks that a state of the memory device is a predetermined state every time the write of the data having a second size smaller than the first size in the memory device is ended, and outputs an interrupt request signal to said microprocessor in accordance with an end of the write of the data having the first size in the memory device, and wherein said memory control means does not output the interrupt request signal to said microprocessor before the write of the data having the first size in the memory device is ended.

2. The apparatus according to claim 1, wherein when the state of the memory device is not the predetermined state, said memory control means stops writing the data in the memory device.

3. The apparatus according to claim 1, wherein said memory control means has comparison means for comparing status data read out from the memory device with a preset comparison value and checks the state of the memory device on the basis of an output from said comparison means.

4. The apparatus according to claim 3, wherein said memory device outputs an interrupt request every time the data having the second size is written, and said memory control means reads out the status data from the memory device in accordance with generation of the interrupt request by the memory device.

5. The apparatus according to claim 4, wherein said memory control means reads out the status data from the memory device in accordance with an instruction of a write start of the data having the first size.

6. The apparatus according to claim 1 further comprises state control means for controlling whether transfer of the data by said memory access means is to be executed.

7. The apparatus according to claim 6, wherein the data contains image data, and said state control means controls in accordance with an operation state of image sensing means for outputting the image data whether transfer of the data by said memory access means is to be executed.

8. The apparatus according to claim 7, wherein the state control means stops transfer of the data by said memory access means during a predetermined period synchronized with a vertical sync period of the image data.

9. The apparatus according to claim 1, wherein the second size is decided in accordance with the memory device.

10. A signal processing apparatus comprising:

a microprocessor;

memory control means for reading out data from a memory device; and memory access means for transferring the data read out by said memory control means in accordance with an instruction from said microprocessor, wherein in reading out the data having a first size from the memory device, said memory access means transfers the data read out from said memory control means until the read of the data having the first size is ended, and said memory control means checks that a state of the memory device is a predetermined slate every time the read of the data having a second size smaller than the first size from the memory device is ended, and outputs an interrupt request signal to said microprocessor in accordance with an end of the read of the data having the first size from the memory device.

* * * * *

UNITED STATES PATENT AND TRADEMARK OFFICE
CERTIFICATE OF CORRECTION

PATENT NO. : 7,198,191 B2  Page 1 of 1
APPLICATION NO. : 10/927018
DATED : April 3, 2007
INVENTOR(S) : Saga It is certified that error appears in the above-identified patent and that said Letters Patent is hereby corrected as shown below:

COLUMN 14:
Line 26, "slate" should read -- state --.

Signed and Sealed this

Twenty-seventh Day of November, 2007

JON W. DUDAS
*Director of the United States Patent and Trademark Office*